Nov 2, 1937.  H. LOHR  2,097,952
METHOD OF AND MEANS FOR FACIAL TREATMENTS
Filed April 14, 1931   11 Sheets-Sheet 1

INVENTOR.
HANS LOHR.
BY Rudolf Wildermann
ATTORNEY.

INVENTOR.
HANS LOHR.
ATTORNEY.

Nov 2, 1937.  H. LOHR  2,097,952
METHOD OF AND MEANS FOR FACIAL TREATMENTS
Filed April 14, 1931  11 Sheets-Sheet 5

INVENTOR.
HANS LOHR.
BY
ATTORNEY.

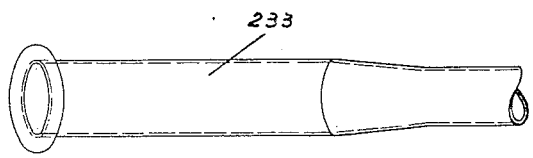
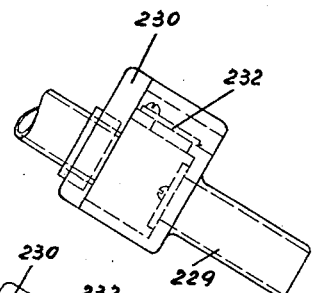
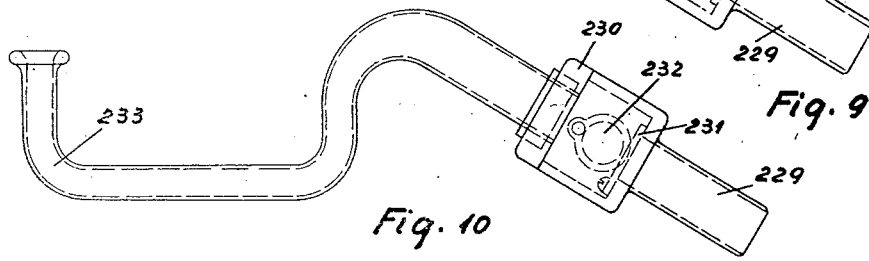
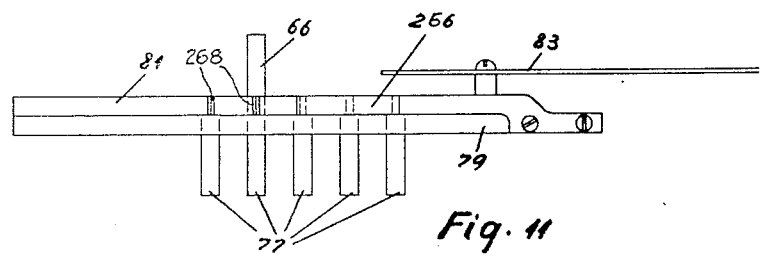
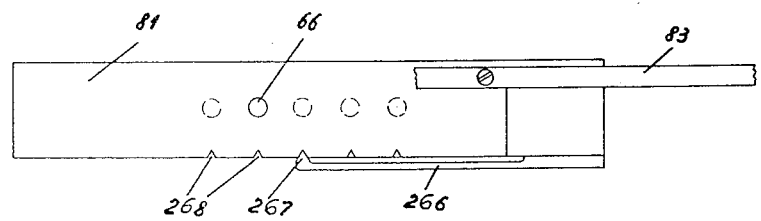

INVENTOR.
HANS LOHR.

Nov 2, 1937.        H. LOHR         2,097,952
METHOD OF AND MEANS FOR FACIAL TREATMENTS
Filed April 14, 1931      11 Sheets-Sheet 9

INVENTOR.
HANS LOHR.
ATTORNEY.

Nov 2, 1937.  H. LOHR  2,097,952
METHOD OF AND MEANS FOR FACIAL TREATMENTS
Filed April 14, 1931   11 Sheets—Sheet 10

INVENTOR.
HANS LOHR.
BY
ATTORNEY.

Nov 2, 1937.  H. LOHR  2,097,952
METHOD OF AND MEANS FOR FACIAL TREATMENTS
Filed April 14, 1931   11 Sheets-Sheet 11
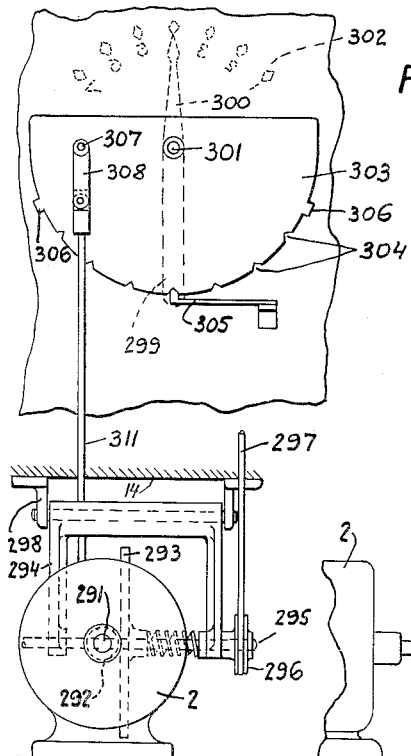
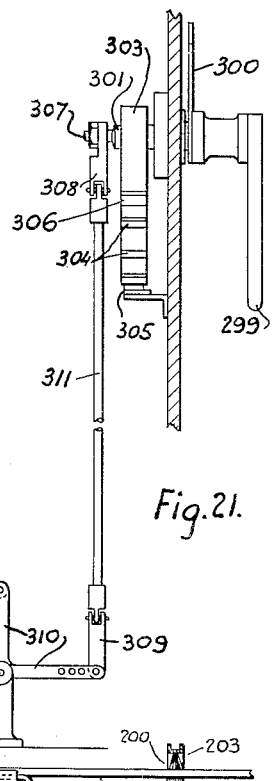
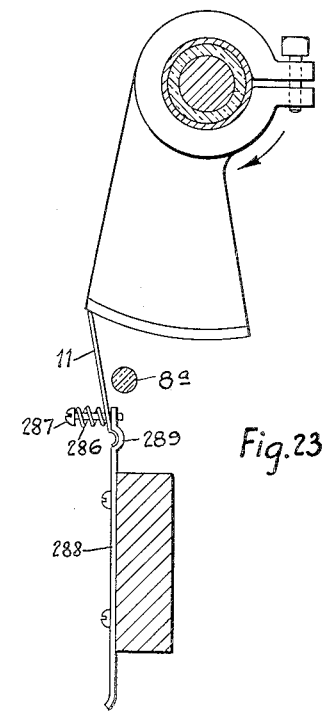
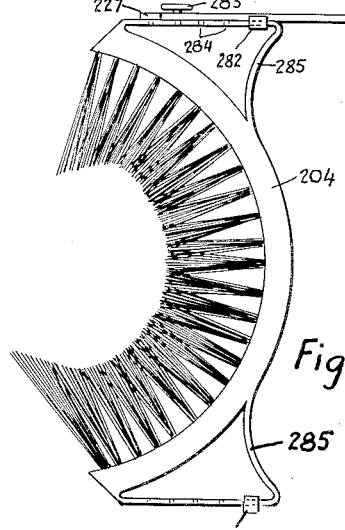
INVENTOR.
HANS LOHR.
BY
Rudolf Wildermann
ATTORNEY.

Patented Nov. 2, 1937

2,097,952

UNITED STATES PATENT OFFICE 2,097,952

METHOD OF AND MEANS FOR FACIAL TREATMENTS

Hans Lohr, Jackson Heights, Long Island, N. Y., assignor to Fillor Famous Facial Corp., Long Island City, N. Y.

Application April 14, 1931, Serial No. 530,034
In Germany April 14, 1930

37 Claims. (Cl. 128—172)

This invention concerns a method of and means for facial treatments in connection with which the head of a person to be treated is accommodated during the whole period of treatment in an enclosure into which are introduced all means of treatment, preferably according to prearranged schedule.

One major object of my invention is a combination of the means which are required to attain the said end with the preferred and particularly adapted construction of the said several means.

Another object of my invention is to provide an apparatus which automatically, according to a fixed schedule, combines a plurality of treatments which are successively, overlappingly or simultaneously applied to a person's face.

A further object of my invention is to provide means allowing a nurse to modify the scheduled treatments in order to adapt them to the particular condition of the skin of the individual to be treated. The order of procedure, in using my machine, is ordinarily as follows:—A physician diagnoses the condition of the skin of the face of the patient. He knows the schedule in which my apparatus is adapted to dispense, in standard rotation, a plurality of treatments. He sets up a chart specifying the medicaments to be used for the various treatments. He orders the omission of certain treatments. The prescription which is thus given by the physician may be followed automatically in the automatic treatment cycle of my apparatus after the nurse has adjusted the controls of my apparatus according to the specifications of the prescription. The whole time of treatment may also be prescribed by the physician and may accordingly be set by the nurse. It is important, however, that in addition to this automatically dispensed chain of treatments, the physician may prescribe special treatments to be applied in conjunction with some of the standard treatments in a case where the skin of the patient has been neglected or is diseased. Such independent additional treatments may be applied by the nurse, constantly observing the effects thereof, and means being provided for preventing access to the enclosure, while these stronger and possibly dangerous medicaments are being applied.

Another object, which was already indicated in the preceding statements, provides for the application of real medicaments to the face of the person to be treated, as contrasted with mere cosmetics. Steam or compressed air engage upon such medicaments in devices of the type of atomizers and project the vaporized, or finely divided medicament onto the face of the patient.

Another object of my invention is to provide automatic means,—by way of contrast with manual means,—for applying certain treatments in quick rotation and overlappingly, in a closed chamber, it being impossible to apply such treatments simultaneously without a chamber, and the rapidity of change being normally fully dependent upon the skill of the nurse. For instance, the effect of the application of hot and cold liquids alternately, under quick changes, is well known in the art of facial treatments, because it is most effective for cleansing, stretching and contracting, and opening up the pores of the face. The great value of automatic means, and of the use of an enclosed chamber for these treatments, is enhanced by the possibility of simultaneously conditioning the atmosphere in the chamber, of varying and fixing the temperature thereof, and of simultaneously applying therapeutic rays and physical massaging means to the skin.

Another object of my invention is to arrange my apparatus in such fashion that mistakes are practically eliminated in the treatments; that the utmost precaution, which is necessary in treating such a delicate part of the body as the skin of the face, is automatically provided for; that only a competent nurse can control and modify the treatments; that other attendants or technicians, who are entrusted with the supervision of the functioning of the mechanism of my apparatus, can in no manner interfere with the kind of treatments applied, or with the manner and rotation in which they are applied.

In addition to these major objects of my invention, there are a number of component objects which will become evident during the perusal of the following description.

The means of my invention comprise an enclosure for the treatment of the head; conduits opening onto and into the said enclosure and adducing the fluids required for the treatment, such as liquids, steam, compressed air, conditioned air, etc; means which are disposed in the enclosure, or which are built onto the enclosure for practical reasons, and which provide, during the period of treatment, illumination, therapeutic irradiation, massage, mechanical drying, photography and mirror observation of the skin of the face, radio presentations, telephone connection and presentation of projected pictures; means producing the fluids introduced into the enclosure, driving means for the producers of the said fluids and for the mechanical and electrical apparatus; and, finally, means for automatic control of the installation for the change from one treatment to the other and for the selection of the means used for these treatments.

The enclosure for the treatment of the head comprises, in addition to the treatment chamber proper, in which the face is exposed to treatment, a downward extension which essentially serves for carrying away the means used during the treatment, an upward extension in which are stored tools needed only at intervals, or during intervals, and a backward extension in which part of the treating means are produced and the back wall of which serves for the purpose of projection during the presentation of pictures. The cover of the enclosure, which contacts with the head of the person to be treated, is detachably arranged upon the front of the enclosure and contains a preferably ovally shaped opening in which are replaceably mounted means made of flexible material which are adapted to encircle the neck of the person to be treated in collar-fashion, and which thus seal the enclosure towards the body of the person to be treated. In order to permit this "collar" to be tightly fittingly arranged around the neck, it is slit, and, in connection with the slit, I provide adjustable closing means. The detachable cover of the enclosure has an inwardly projecting flange, upon which the "collar" may be arranged and clamped onto said cover by means of a suitable frame; thus I facilitate a quick change of the closing means which contact with the person to be treated, as well as a seal of the neck against the enclosure.

The enclosure is provided with suitably screened observation windows which may operate in door fashion so that the enclosure may be approached from the outside. More particularly, I provide, next to the head of the person to be treated, a door in the side wall, which opens inwardly, and through which the said person may insert a hand into the enclosure. In order to protect the hand of the user against the mechanisms operating upon the inside of the enclosure, the door is provided with a stop which appropriately consists of a sector attached to the door and a flange on said sector determining the range through which said door is adapted to swing.

The doors leading into the enclosure may be provided with locking means, preferably relay operated latches, which are automatically actuated from a cam shaft during intervals of time, when the treatments taking place inside the enclosure do not permit the hand to be passed into the enclosure or when the enclosure should not be opened.

A light, provided in the upper extension back of the face of the person to be treated, illuminates the treatment chamber, and is shaded in such manner that it prevents molestation of the person to be treated. That lamp also serves as a signal indicating that the machine is under current, and that the treatments are proceeding properly.

To convey news to a person, while being treated, or to allow him to carry on a conversation, a loud speaker may be built into the wall of the enclosure, and a telephone may be provided for. In a lateral extension of the enclosure, I provide means for photographing the skin of the face; I also provide a mirror, which may be convex, and which may be slid along a track into the treatment chamber without necessitating an opening of the enclosure to the outside atmosphere.

Upon the interior of the enclosure, I provide brush-like means which are substantially vertically movable; and by means of which the face may be massaged, cleaned, washed, dried or by means of which fluids may be distributed over and worked into the skin of the face.

Upon the downward extension of the enclosure opens a conduit through which steam is introduced; and the said opening is faced by a plate which laterally overlaps the said opening to a considerable distance. This is a protective measure which prevents the issue of steam onto the face of the person to be treated when the steam is too hot, carries boiling water, or is under too much pressure. The diverted steam fills the treatment chamber from below.

A container extending over substantially the whole enclosure near the top thereof, is connected with liquids and is provided with a number of small openings upon its bottom face; it serves for spraying the inside of the enclosure or the face or the head of the person who is being treated.

The temperature of the treatment chamber may be increased in order to cause perspiration of the head and face, in Turkish bath fashion, by electric lamps mounted on the back wall of the treatment chamber proper, upon both sides of the opening through which the backward extension connects thereto.

To facilitate a cleaning of the treating chamber, I provide douches which may be pulled out of its back wall and which may be actuated by manipulation. The conduit connecting said douches to a liquid is carried over rollers and weighted, or provided with tension means, so that the douches are automatically pulled back into the back wall, when released. Only one hand is necessary for operating these douches, since the said hand directs the douche, and, at the same time, operates the valve thereon.

In the upper extension of the enclosure, a towel is folded together or rolled up and is attached along its upper extent in such manner that it may be slid over the massaging brush, and then is carried over the face for the purpose of drying the same.

To prevent the steam entering upon the enclosure from passing out of the enclosure through the drain, which is provided upon the downward extension of the enclosure for the purpose of carrying away waste-fluids, the treatment chamber proper is separated from the lower extension by a false bottom which is provided with a slot for draining waste-fluids. The said slot has a flange extending downwardly into a vessel which is filled with a liquid, so that liquids are drained by running over, the escape of gases, steam or vapors being, however, prevented unless they are under pressure.

Upon the outside of the enclosure, within reach of the person under treatment, a switch is provided by means of which sound or light signals may be electrically actuated.

A common motor may be used for driving the various mechanical devices such as compressors, pumps, hot air producers, brush mechanisms, etc. It is however particularly practical to drive these particular devices by separate motors which are controlled from a motor driven commutator or cam shaft. The various conduits may suitably be controlled by electro-magnetic valves of a construction well known in the respective art, which are likewise controlled from the above mentioned commutator, by cam operated mercury switches or by an equivalent timing device.

This timing device passes through one revolution during the treating period. A control of the said period is made possible by controlling the speed of the motor which drives the commutator or by providing a variable drive speed between the motor and the commutator.

The commutator drum consists of a plurality of sectors arranged upon a shaft which is in a split bracket, current being adduced to the shaft and the sectors by means of a slip ring. The current is taken from the segments by brushes which are connected to the motors driving the various devices, and to the electro-magnetic valves and locks. In order to prevent the vibrations of the contact brushes, and in order to prevent a noise when said brushes slide off the respective segments, an insulated stop intercepts the movement of the brushes, when they snap off the sectors. The said stop may take the form of a rod made of insulated material which is parallel to the shaft of the commutator.

A cam is provided for upon the shaft of the commutator drum, suitable lugs on said cam actuating signals, whenever there is a change from one step of the treatment to another. The said shaft also carries means rotating a hand, which is positioned in front of a dial, and which indicates the step of the treatment through which the mechanism is passing at a certain time. This hand makes contact with an arm, just before the full treatment cycle has been finished, and a signal circuit is thereby closed, so that the attention of the operator is called to the expected end of the treatment. When the hand reaches the end (and starting) position of the treatment, it actuates a mercury switch, by means of which the main circuit of the whole apparatus is broken, so that the whole mechanism comes to a stop.

In order to illustrate which treatments are being given successively, simultaneously or overlappingly, the dial is provided with annular sectors, each of which has reference to a certain particular treatment. Of course a reversal of the arrangement is possible, the hand being stationary and the dial rotating with the cam shaft and the commutator. When the machine is to be placed into service by the nurse, he or she lifts the hand over the stop which has caused the opening of the mercury switch, and he thereby closes the main circuit and sets the machine into operation for a new treatment cycle.

Another mode of construction and operation provides a slot mechanism in connection with the mercury switch, the insertion of a coin into the slot mechanism releasing the hand and starting the treatments.

The introduction of certain liquids into the treatment chamber is brought about by compressed air, the outlets of the compressed air and of the conduits of said liquids being arranged in atomizer fashion in the enclosure. In order to be able to introduce a plurality of liquids independent of each other, a plurality of compressed air outlets upon the inside of the enclosure are connected to the compressor, electro-magnetically actuated valves being provided between the compressor and said outlets.

The liquids which are to be atomized by the compressed air may be drawn from different containers, means for selecting such containers being provided for. Those means consist of a valve which has a stationary plate into which open the suction means extending into the various containers of different liquids. A suction plate which carries a conduit is slidably arranged upon the stationary plate, and may be shifted thereupon into various positions in which the conduit on the slidable plate communicates with one or the other of the various connections between the stationary plate and the liquid containers. The conduit upon the slidable plate is flexibly connected to the atomizer upon the inside of the enclosure, the air, which is blown out of the compressed air outlet, sucking the liquid from the container which is connected by the slide valve to the atomizer.

The slidable plate is connected with an endless belt which is tightly extended over rollers and which may be adjusted by rotation of one of the rollers. A resiliently arranged catch, which operates between the stationary and slidable valve plate, provides for the setting of the slidable plate in such positions only, in which the conduit, which is connected thereto, registers with one of the openings in the stationary plate.

Hot liquids, which are required during treatments, are prepared in a suitable reservoir, by electric heating means, the temperature thereof being regulated by automatic temperature control means. The cold and warm water reservoirs are arranged near the top of the apparatus in order to provide a suitable pressure head for the douches and sprays.

The cold and warm water are carried from their respective reservoirs in separate conduits to a spray which extends into the enclosure. The quantity of cold and warm water adduced to the enclosure, is regulated by electro-magnetic valves in the respective conduits which are controlled from the commutator. Alternate cold and hot water douches, as well as lukewarm douches may be brought about by alternate or overlapping actuation of the respective valves.

The spray means which are provided in the upper extension of the treatment chamber are fed by an independent conduit which is also controlled by an electro-magnetic valve. Electro-magnetic valve-controlled branch conduits introduce into the last mentioned conduit conditioning liquids from separate containers; the conditioning liquids may be perfumes, purifiers, disinfectants, or other medicaments.

The electrical conduits connecting the commutator to the various motors and electro-magnetic valves and locks, all comprise switches by means of which the respective functions may be manually eliminated from the cycle of treatments. This makes it possible to modify the treatment steps according to the particular treatment which may be required for a certain individual. I also provide switches which may be operated by the person to be treated, which allow that person to eliminate or stop certain treatments, and others by means of which the whole apparatus may be stopped, if so desired. There are other switches within reach of the person to be treated by means of which he or she can bring about certain other treatments in the apparatus, the said switches operating electro-magnetic valves or motors, which actuate the respective devices.

In the back of my apparatus, I provide a projection apparatus which is controlled by the commutator or by hand, and which projects lantern slides or moving pictures onto the rear wall of the backward extension of the enclosure.

The massaging means which are provided upon the inside of the enclosure, comprise a frame; to this frame, brush-like means which comprise bristle-, hair-, rubber-, or other members, are adapted to be attached. The frame detachably extends from the front of two levers which extend from the back into the enclosure, and which are disposed longitudinally slidable and swingable upon a horizontal pivot. The levers swing in a substantially vertical plane and can simultaneously be oscillated longitudinally.

The rear ends of the levers are engaged upon an endless, curved loop, the brush means at the front end of the levers being carried through a path similar to that loop. That path consists of a frontwardly and a backwardly disposed curve, which are connected with each other at their upper and lower ends, the brush passing over the face of the person to be treated while it passes through the frontwardly disposed curve. The rear ends of the levers are operated by an eccentric which is driven by an electric motor. The electric motor is controlled from the commutator. In order to bring about a smooth operation of the lever in a curved, endless path, switch means are arranged at the point where the front and back curves branchedly connect to each other, said switch means being positioned by tension means.

In order to bring the massage means into a position removed from the face of the person to be treated, after the massage treatment has been finished, I provide means to stop the movement of the massage means in their highest position, in the upward extension of the enclosure. For this purpose the shaft of the commutator drum is provided with a cam which brings the mechanism to a stop when the brush means are at their highest position in the enclosure.

In order to prevent a sudden overload on the motor driving the massage means, a friction clutch is provided between the motor and the respective mechanism. Where the levers extend through the wall of the enclosure, slots are provided in said wall, which are closed by abutting, yieldable means, brush means for instance, which do not prevent the movement of the arms, but which prevent the escape of fluids from the enclosure.

Fluids are added to the steam adduced to the enclosure. The means serving for the selection of the fluid to be used and for the introduction of said fluid into the steam, have been mentioned before. The containers in which these fluids are stored are removed from sight. Between such a container and the respective conduit, I provide a liquid gage, which can be seen from the outside of the apparatus, and which is of sufficient size to provide fluid for a number of additional treatments after the respective containers have been emptied.

The fresh air adduced to the enclosure is supplied by a separate motor driven pump. The pump receives the air from a container in which it is conditioned by chemical process or by mixing suitable agents thereinto. From the pump the air passes to the enclosure through a vessel containing a liquid which serves to improve or cleanse the air. In order to enable a ready change of this liquid, I provide a plurality of such vessels, each of which is connected to a separate branch of the air conduit, each branch being provided with selective valve means.

Ordinarily, the conditioned air freely issues upon the enclosure. Under certain conditions, I provide however means for adducing air to the person to be treated through a hose, which is provided with a suitable mouth piece to be received by the mouth of said person. This mouth piece is connected to a branch of the air conduit, so that air is also freely blown into the enclosure, while the person to be treated is fed with air through the mouth piece. The mouth piece is provided with intake and outlet-, one-way valves, the intake valve being connected between the mouth piece and the hose, whereas the outlet valve issues outwardly. When the person to be treated is fed with air through the mouth piece, his or her nose is preferably closed by suitable clamping means.

The mouth piece is particularly shaped for the use in connection with my apparatus, so as to obstruct to the least possible extent the operations performed on the face of the person to be treated. For that purpose it is curved to pass from the mouth of the user down, and back underneath his chin, the mouth piece and valve means being balanced in such manner that they depend from the mouth by their own weight in the same manner in which they are supposed to be disposed for the purpose of least obstructing the treatment and disaccommodating the user. At the same time, these means immediately drop from the operating sphere, if the user should release them from his mouth.

My apparatus also includes a particularly adapted ozonator. By providing a spark gap in the backward extension of the enclosure, and by blowing the conditioned air, when it is introduced into the enclosure, through said spark gap, the atmosphere of the chamber is enriched in ozone.

The hot air introduced into the enclosure is taken from a hot air producer, and I provide a vessel in front of the intake of said producer which contains ingredients influencing the condition of the air passing thereover.

In case a plurality of apparatus of my invention is arranged near each other, the compressed air, the steam, the hot and cold water, the conditioned air, etc., are prepared or produced in means common to all of these apparatus. When such a series arrangement is provided for, walls separating the adjoining apparatus, are provided, such walls containing tools which are accessible from both sides. In this manner the construction of each apparatus may be considerably simplified.

The general lay-out of my apparatus is such that the selective and standard control means are arranged upon the front thereof, whereas the driving and operating mechanism opens towards the rear, a separating wall completely extending between the front and the rear of the apparatus. This is of particular advantage in the above referred to series arrangement where an aisle passes along the rear of a plurality of aligned machines, and allows a technician or mechanic to approach the supply means and the mechanism of all machines, but he cannot influence the control means. The treatment will take therefore a predescribed course, for which the control means at the front of each apparatus are set by a nurse whose operating sphere is limited to the space in front of the machine. Thus I prevent tampering with the control means by anybody but the person authorized to do so, e. g., a nurse, who sets the control means according to the prescription issued by a physician, who has diagnosed the condition of the complexion of the person to be treated. But the nurse cannot upset the automatic cycle of treatments.

The hand of the person to be treated, with which he or she may enter upon the enclosure, may be provided with a glove, which tightly encircles the wrist and which is provided on the inside with a layer of absorptive material, which serves to dry the part of the face touched by the user.

In order to protect the eyes of the person to be treated, I provide special goggles which substantially fit into the eye sockets. The ordinary kind of goggles would be unsuitable for this purpose, because they rest above the eye sockets, and would prevent the treatment from taking effect upon the skin surrounding the eyes.

The drawings exemplarily illustrate a mode of executing my invention.

Fig. 8 shows a rear view of the sectioned mouth piece.

Fig. 9 shows a rear view of the valve means used in connection with the mouth piece.

Fig. 10 shows a side view of the mouth piece together with the valve means.

Figs. 11 and 12 show side and top views of the selective slide valve.

Figs. 21 and 22 are sectional rear and side views, respectively, of a modified drive for the timing device.

Fig. 23 is a sectional side view of the commutator, showing details of a brush operating thereon.

Fig. 24 is a plan view of the applicator, (massage brush) and the respective supporting means.

Similar numerals refer to similar parts throughout the various views:—

Figure 1:
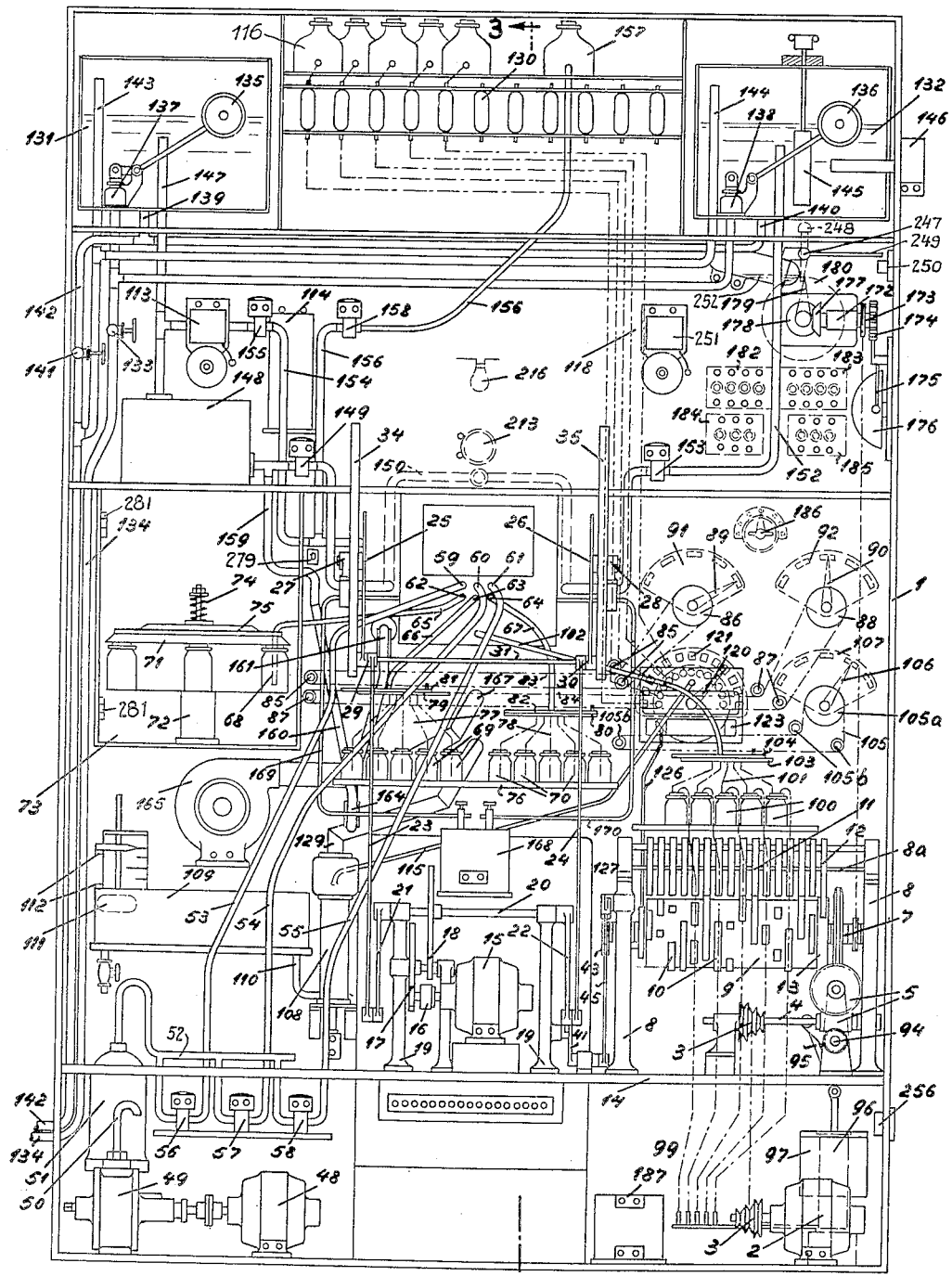
Fig. 1 shows a rear view of the whole apparatus, after the rear wall has been removed.

The motor 2 is arranged upon the bottom of the housing 1 of the apparatus and it drives, by means of the step pulleys 3, the shaft 4 which is rotatably mounted upon the shelf 14 extending across the housing of the apparatus; the shaft 4 is mounted upon a worm wheel reduction unit 5 which in turn drives a similar unit 6, so that the shaft 7, which is mounted upon the worm wheel of unit 6, and which is rotatably mounted in the stands 8, is driven at a greatly reduced speed.

The commutator 9 comprises the sectors 10 (Fig. 23) upon which brushes 11 are adapted to slide. Since the commutator rotates at a very low speed, the brushes 11 snap off the sectors 10 quickly, in order to avoid arcing, under tension of springs 286 on screws 287, said springs and screws serving at the same time to retain the brushes upon contact lugs 288; the curved rear ends of said brushes are journalled in depressions 289 on said lugs. Current is adduced to the insulatedly mounted commutator 9 by means of the brush 12 which slides upon the slip-ring 13. The stands 8 are split, where they support the commutator, so that the commutator may readily be taken out of the machine for the purpose of modifying the duration of treatments and the time when they are applied. Between the stands 8 extends a rod 8a which is made of insulating material and against which snap the brushes 11 when they are released from the sectors 10.

When I have reference in this specification to commutators, I desire to include in that term all automatic timing devices, by means of which a plurality of operations are controlled according to a predetermined schedule in a fixed cycle. The control might for instance be purely mechanical, or I may operate a plurality of mercury switches by cams.

The motor 15 is mounted upon the shelf 14, and drives, by means of the friction coupling 16 and a pair of gears 17 and 18, the shaft 20 which is journalled upon the standards 19. The crank levers 21 and 22 are mounted upon the shaft 20; they are connected with the rear ends of the levers 25 and 26 by pitmen 23 and 24. The massage levers 25 and 26 are slidably supported by pivots, which are fulcrumed in the bearings 27 and 28; at the joints 29 and 30, where the pitmen 23 and 24 are engaged upon the levers 25 and 26, a common shaft 31 extends through these parts. The free ends of this shaft 31 extend beyond the joints and are engaged upon the curved tracks 32 and 33 in the vertically disposed plates 34 and 35. These curved tracks merge at their upper and lower ends and, at the lower junction point, a switch 36 is provided for, a tongue of which is normally held in the position shown in Fig. 3 by spring pressure, so that the free ends of the shaft 31 follow the curved rear track in moving up. When the shaft moves down in the front track, it pushes the tongue of the switch 36 out of the way. Hence the shaft moves along an endless path through both curved tracks as indicated by the arrow heads 37. The front ends of the levers 25 and 26 pass through the curve indicated by arrow heads 38. In order to stop the massage means, when the front ends of the levers are in their highest position, the lever, which is fulcrumed at 40, is provided with a lug 39, upwardly protruding therefrom, which is adapted to be engaged upon a lug 42 extending from the pitmen 23 and 24. The free end of lever 41 is operatively engaged upon the cam 43 on shaft 7, owing to the connection provided by the angle lever 44, connecting rod 45, levers 46 and 46a and the link 47.

Upon the floor of the housing 1 I arrange the motor 48 which drives the compressor 49. Air is sucked into the said compressor through the tubing 50 and it is discharged under pressure into the air dome 51 to which connects the manifold 52. The latter connects to three branch conduits 53, 54 and 55, which respectively are provided with valves 56, 57 and 58, said valves being electromagnetically controlled from the commutator drum 9. The conduits 53, 54 and 55 lead to a backward extension of the enclosure, and there terminate in the nozzles 59, 60 and 61. These nozzles are faced by the nozzles 62, 63 and 64, through which issue the conduits 65, 66 and 67 of the treatment fluids coming from containers 68, 69 and 70.

A plurality of containers 68 depend from the plate 71, into the bottom of which they are screwed. There is a hole provided in plate 71, in registry with each of the containers 68, through which the free suction terminals of the conduits 65 may manually be extended into one of the containers 68. (Access to these containers is had through door 280.) The plate 71 is rotatably mounted upon a standard 72 which is accommodated in a niche 73 of the housing 1. The plate 71 is pressed by the spring 74 against the stationary plate 75, which has only one hole for the passage of the suction conduit 65. That hole may be registered with one or the other of the containers 68, the plate 75 closing the other holes in plate 71 from which depend the other containers 68. By rotation of plate 71, each container 68 may be brought into registry with the hole in plate 75, so that the suction conduit 65 may be extended thereinto. Legends on plate 71 identify the liquids in the containers depending therefrom, and these legends may be brought into alignment with a mark on plate 75 whereupon the suction conduit may be extended into the liquid, which is identified by the respective legend.

Different means of selection are provided in respect to the containers 69 and 70. These containers are arranged in alignment upon the shelf 76. The suction conduits 77 and 78, extending into the sets of containers 69 and 70 respectively, connect at their upper ends to stationary horizontal plates 79 and 80, which are in corresponding alignment. With the tops of these stationary plates slidably contact the plates 81 and 82, respectively, conduits 66 and 67 extending from each of the last mentioned plates. By transversely sliding the plates 81 and 82, the conduits 66 and 67 may respectively be connected with each of the suction conduits 77 and 78.

In order to position the plates 81 and 82, endless steel bands 83 and 84 are attached thereto, which lead over rollers 85 and 86, and 87 and 88, respectively. The shafts of rollers 86 and 88 extend through the front wall of the housing 1 and they carry the handles 89 and 90, respectively, by means of which the rollers 86 and 88 may be turned, which, in turn, slide the plates 81 and 82 transversely over the plates 79 and 80. The handles 89 and 90 are provided with pointers which face the dials 91 and 92. Upon the dials the position of the plates 81 and 82 may be observed,—in other words, they indicate, to which of the containers 69 and 70 the conduits 66 and 67 are respectively connected. In order to stop the slidable plates 81 and 82 in a position of alignment of the conduits 66 and 67 with the respective conduits 77 and 78 below, respectively, I provide tensil positioning means as shown in respect to the valve 79, 81 in the views of Figs. 11 and 12. Upon the side of the stationary valve plate 79, the flat spring 266 is fastened, which is provided at its free end with a wedge 267 laterally protruding therefrom, said wedge being adapted to snap into one of the notches 268 in the slidable valve plate 81, when the continuation conduit 66 is in exact alignment with one of the conduits 77 below.

Into a worm, which is mounted on shaft 4, and which forms part of the reduction unit 5, downwardly meshes the worm wheel 93 (Fig. 2) which is mounted upon the shaft 94. The shaft 94 carries upon its end a crank which is connected to the piston of the air pump 96 by means of the pitman 95. The pump takes in air from the container 97 which contains air conditioning means and which is closed by a cover. From the outlet of the pump extends the manifold 98, from which branch off the air conduits 99 into the vessels 100. Each of the said vessels contains an air conditioning liquid, through which bubbles the air which is led thereinto. The conduits 101 which lead from said vessels pass to a selective valve, by means of which one or the other of the conduits 101 may be connected to the conduit 102, which leads to the enclosure. The selective valve is similar in construction to the above described valves, i. e. it consists of a fixed valve plate 103, a slidable valve plate 104, an endless band 105 extending over rollers 105a and 105b, and a handle 106, a point on which registers upon the dial 107.

A liquid, coming from the storage tank 109, is carried by the conductor 110 to the steam generator 108 in which the said liquid is evaporated by means of an electric heating coil. Of course other heating means may take the place of the electric heating means. The liquid contained in the tank 109 actuates the float 111 which in turn closes, by means of two contacts 112, the battery circuit 114 through an electric alarm 113, when the liquid sinks to so low a level that it must be replaced. Of course, the said float may be connected to a water supply line from which water is automatically admitted to the tank when the level of the liquid descends below a lower limit.

Figure 2:
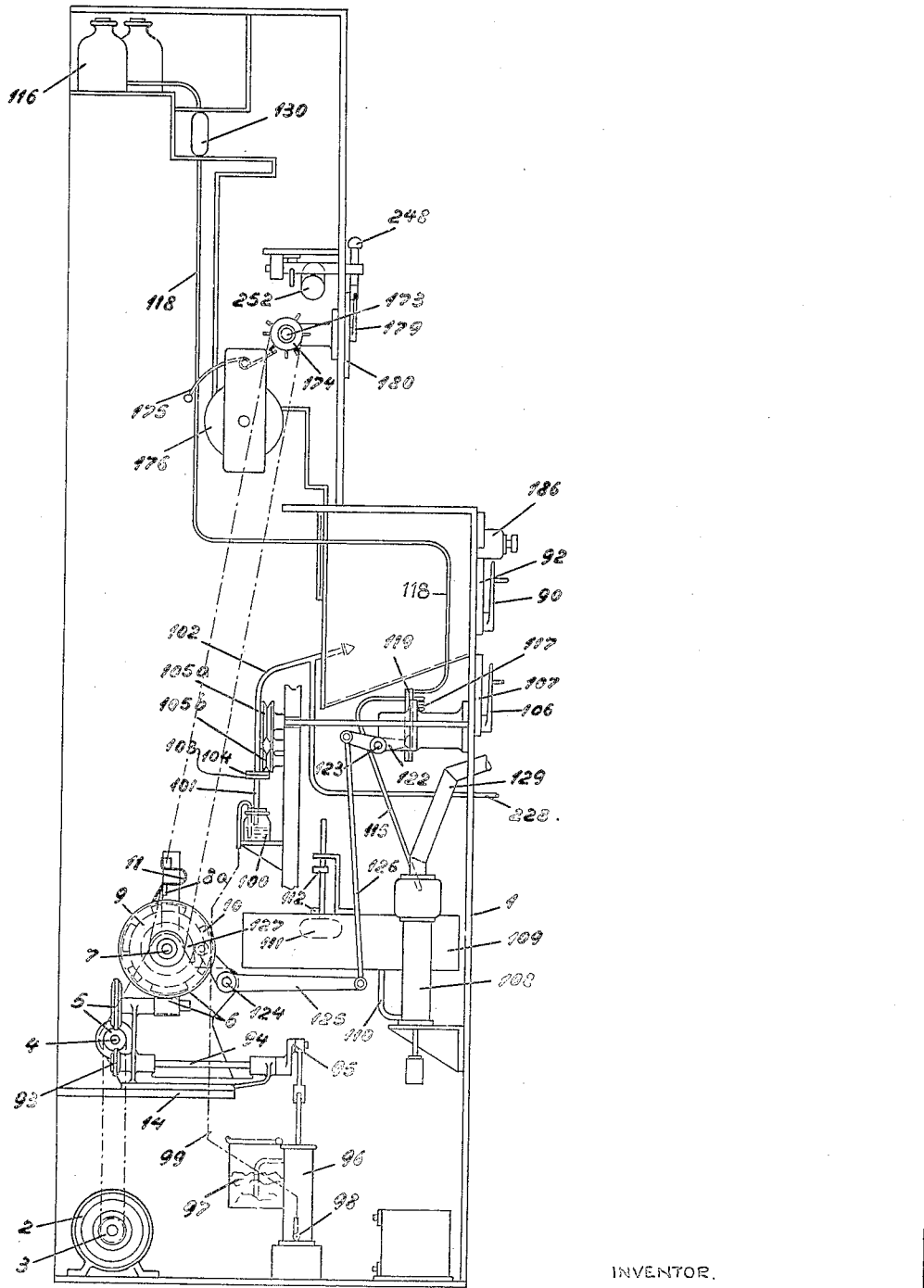
Fig. 2 shows a corresponding side view, the side wall being omitted.

Conditioning liquids are introduced into the steam generator 108 through the pipe 115 from one of the vessels 116, which are accommodated near the top of the housing 1, the liquids descending from said vessels by gravity. The selection of the desired liquid is brought about by a selective valve of the kind previously described, as shown in Fig. 2. The valve consists of a rotatable plate 117, upon which open the conduits 118 from the vessels 116, and the slidable plate 119 to which connects the conduit 115 from the steam generator 108. Both plates are vertically arranged, and the plate 117 may be shifted around its horizontal axis by means of the handle 120 (Fig. 1), said handle being arranged at the front of the housing 1 in alignment with the dial 121. The respective vessel 116 is therefore connected to the steam generator. But when the plate 119 is in its lowest position, the mouth of the respective conduit 118 as well as all the other conduits 118 are closed. Lever 122 is fulcrumed at 123, and it may be operated by connecting means which comprise the double lever 125, fulcrum shaft 124 and the connecting rod 126. The free end of lever 125 carries a roller which is engaged upon a cam 127 on shaft 7, a spring being provided on the shaft 124 of lever 125, by means of which the roller is tensioned onto the cam 127.

The generator 108 issues steam into the enclosure by means of the pipe 129. The conduits 118 comprise the liquid gages 130 which are visible from the front of the apparatus and which also serve as reserve containers from which liquids necessary for treatments are available while containers 116 are being refilled.

Additional liquid containers 131 and 132 are arranged near the top of the housing 1. Liquid may be adduced to these containers through a pipe 134 which may be shut off by means of cock 133. That pipe comprises a pair of valves 137 and 138 which respectively are controlled by floats 135 and 136. The pipes 139 and 140, issuing from the bottom of the containers 131 and 132, respectively, serve for the purpose of completely draining the said containers, and they both issue upon the pipe 142, which is provided with a cock 141. The two over-flows 143 and 144 also issue upon the pipe 142, but below cock 141, so that a protection against overflow of the tanks is provided even when the said cock is closed.

An electric heating element 145 is submerged in the liquid contained in tank 132. That element is provided with a thermostatic control 146.

Cold water is withdrawn from tank 131 by means of the pipe 147, said pipe leading to an intermediary tank 148, and from there through an electro-magnetically controlled valve 149 into a conduit 150. The conduit 150 connects to the spray 151 in the enclosure. Onto the spray 151 also issues a conduit 152, which carries warm water from tank 132. The conduit 152 is closed by an electro-magnetically controlled valve 153.

From conduit 147 branches off the conduit 154 which is provided with an electro-magnetic valve 155. This branch conduit carries liquids to the spray means. A conduit 156 which opens into the conduit 154 carries ingredients from the container 157, and it may be shut off by the electromagnetically controlled valve 158.

Figure 13:
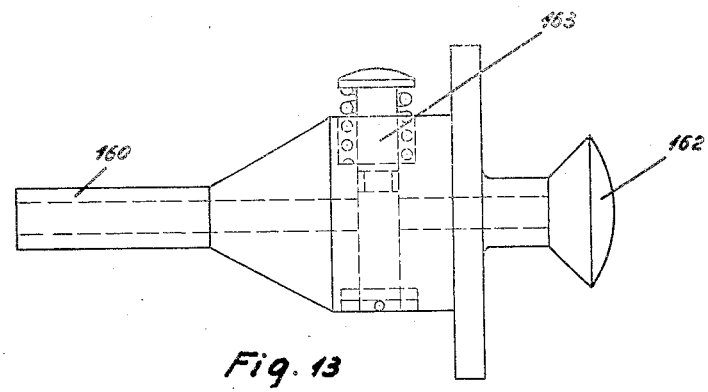
Fig. 13 shows a side view of a douche and valve, which are removably seated in the lower part of the enclosure.

Above the valve 149 a conduit 159 branches off the conduit 150. That branch conduit comprises a hose 160 which extends over the fixed roll 161, its free end extending into the treatment chamber where it carries the douche 162; the latter is provided with a manually controlled valve 163, (Fig. 13). The hose 160 extends over a movable roller 164 from which is suspended a weight so that the douche 162 is normally pulled back into its seat in the rear wall of the enclosure. From there it may be pulled forth and may be used for cleansing the whole enclosure. The douche may be manipulated with one hand.

The air blower and heater 165 is arranged upon a shelf extending from the back of the front wall of the housing 1. This device sucks air through the container 166, which is filled with chemical preparations. These preparations give off vapors when the air passes thereover. From the hot air producer 165 the air is blown through the tubing 167 into the enclosure.

Upon another shelf I provide the high tension generator 168, from which leads 169 and 170 lead into the enclosure.

The shaft 7 is connected by means of a sprocket and chain to the shaft 173 which is journalled in bracket 172. The shaft 173 carries a cam or toothed wheel 174, the teeth of which actuate the clapper 175 of gong 176. The teeth are arranged in such manner that the gong 176 is struck each time before the beginning of a new treatment. The miter gears 177 and 178 connect the shaft 173 to the hand 179 which is located upon the outside of the housing 1 in front of its front wall. The hand 179 rotates in synchronism with the shaft 7, indicating the relative position of the cams and of the commutator, and indicating the step of the treatment, through which the mechanism of the apparatus is passing, upon a dial 180 which is mounted upon the front wall of the housing below said hand 179.

Figure 14:
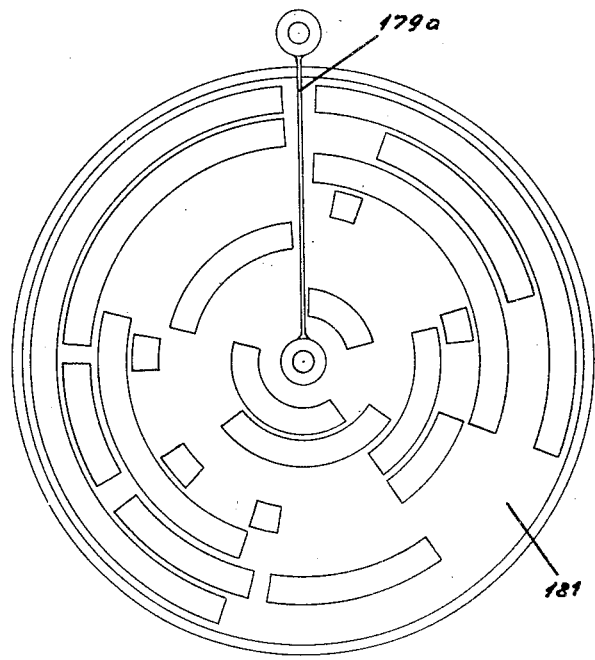
Fig. 14 shows a front view of a dial on which the progress of the treatment is observed.

This indicator may be modified so that the dial takes the place of the hand, the dial being mounted upon the shaft of the miter gear 178. Such an arrangement, in which the pointing means are stationary, and in which the dial rotates is indicated in Fig. 14. Here 181 is the rotating dial and 179a the stationary indicator or pointing means. The dial 181 is provided with a plurality of concentric annular sectors. The sectors, over which a radius of the dial extends, indicate simultaneously applied treatments; sectors arranged on one circle of a certain diameter represent like treatments. In this manner, it is possible to identify simultaneous treatments, and, at the same time, the indicating means 179a always show, which treatments are being applied. The various sectors may carry legends which are arranged in such manner that they can always be read while the apparatus is passing through the treatments indicated thereby.

The stationary dial 180 is laid out in a manner equivalent to the arrangement of dial 181. The hand 179 rotates on top of it, one revolution thereof indicates one complete cycle of treatments. When the hand 179 approaches the vertical position, it strikes the pin 248 which extends through a shaft 247. The shaft 247 is thereby rotated and a contact lever 249, which is mounted upon said shaft, then closes, by means of the contactor 250, the circuit of the electric bell 251, indicating the approach of the end of the treatment cycle. The circuit of bell 251 is energized by battery 114.

On the shaft 247 is also mounted a mercury switch 252 which is connected in series with the main circuit of my apparatus. After the bell 251 has been sounded, the hand 179 continues in its rotation and it finally rotates the shaft 247 to such an extent that the mercury switch 252 is tilted into a position in which the main circuit is broken, and the whole apparatus is stopped. Pulling up the pin 248, which is loosely disposed in the shaft 247, the mercury switch is released and the whole mechanism is thereby started again. Said manual starting operation may be replaced by a slot mechanism, in which the insertion of a coin into a slot swings the mercury switch into a closed position and thereby starts the operation of the apparatus.

In the front wall of my apparatus, I provide the panels 182, 183, 184 and 185 which contain a plurality of switches, each of which is connected in series into the circuit of one of the brushes 11, so that each treatment or each operation, which is ordinarily performed by my apparatus during the full cycle of a complete treatment, may be shut off, or eliminated from a proposed schedule of treatments.

Figure 3:
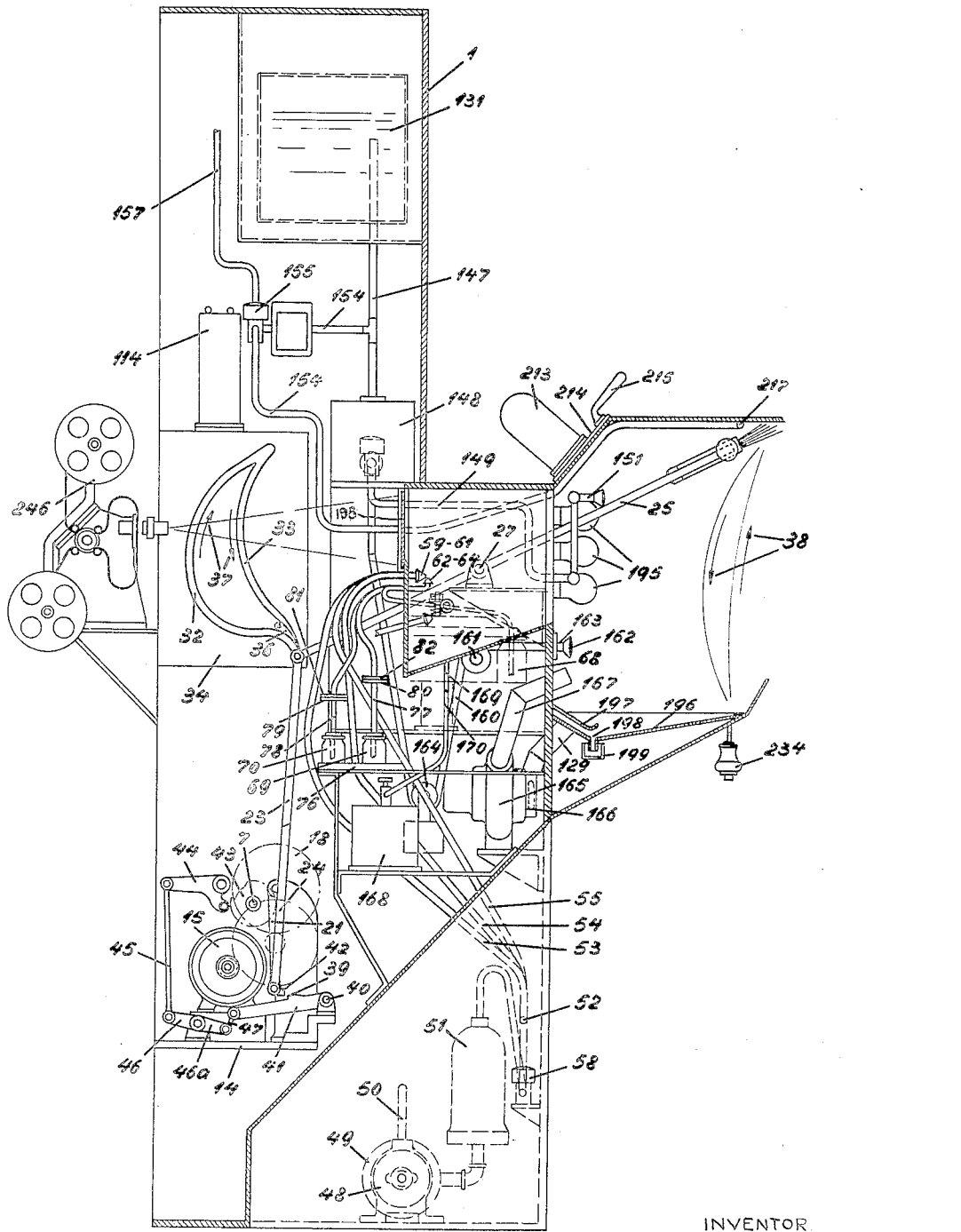
Fig. 3 shows a corresponding sectional side view.

A rough adjustment of the speed required for one full treatment may be obtained by means of the step pulleys 3. In the views of Figs. 1, 2, and 3, the handle 186, which protrudes from the housing, operates a rheostat which, in a plurality of steps, controls the speed of motor 2.

A modification of the arrangement which permits the arbitrary lengthening or shortening of the period of the treatment cycle is shown in Figs. 21 and 22.

There the shaft 291 of motor 2 is provided with a friction driver 292 which engages upon friction disc 293. The latter is mounted on shaft 295 in a forked swing bracket 294 and tensioned in said bracket against the driver 292. Shaft 295 carries a pulley 296 which connects to shaft 4 by means of belt 297. Bracket 294 is suspended from stands 298 which are mounted upon the bottom side of shelf 14. The angular position of bracket 294, which determines the speed of rotation of shaft 295, is controlled by handle 299 with pointer 300 which take the place of the rheostat handle 186 of Fig. 1 in the showing of Figs. 21 and 22, and which operate on shaft 301 in front of dial 302 on housing 1. Shaft 301 carries a notched disc 303, and notches 304 correspond to the division of dial 302 and are engaged by catch 305. Limits for the movement of disc 303 are set by stops 306. By means of crank pin 307, universal joints 308 and 309, angle-lever 310 fulcrumed at 313, and connecting rods 311 and 312 the disc 303 is operatively connected with bracket 294. The radius at which driver 292 is set to engage disc 293 determines the speed at which the mechanism of my apparatus passes through one cycle of treatments.

The therapeutic lamp 213 is supplied with suitable energy from the transformer 187, which is mounted on the floor of the housing 1.

From the front of the housing 1 extends the enclosure 188, which is shown in detail in Figs. 4, 5, 6, and 7. It consists of the treatment chamber proper 189, a rear extension 190, an upward extension 191 and a downward extension 192. The rear extension 190 is narrower than the treatment chamber 189 and it extends to a certain distance into the housing 1; but said extension is broadened towards its rear end.

The upper part of the rear wall of extension 190 has an exchangeable translucent screen 193 which is suited for the projection of pictures.

Through the lower part of the rear wall extend the conduits 53, 54 and 55 for compressed air, 65, 66 and 67 for liquids, and 102 for conditioned air.

From the sides, the two conduits 166 and 167 enter upon the extension 190, forming the spark gap 194 in the interior of said space. The conduit 102 is directed onto the spark gap, so that the ozone set up in the spark gap is mixed with the air issuing from said conduit.

Upon either side of extension 190 electric lamps 195 are arranged upon the back wall of the treatment chamber 189; they serve to produce heat.

Laterally disposed, below the chamber 189, the douche 162 is arranged. Centrally below extension 190, the hot air conduit 167 issues upon the treatment chamber.

Still further below is the steam inlet 129. It is arranged below a false bottom 196 which separates the extension 192 from the treatment chamber 189. In front of the outlet 129 I arrange the plate 197 onto which issues the steam. The steam passes around the edges of this plate into the treatment chamber. The false bottom 196 is arranged at an incline towards the slot 198, the edges of which are turned over downwardly, in flange fashion. That flange extends into a vessel 199 which is arranged below and which is filled with a liquid. The liquids which are to be drained from the treatment chamber flow over the sides of vessel 199, whereby a liquid seal on the chamber is provided in a downward direction.

Upon both sides of the extension 190, the chamber 189 is provided with vertical slots 200 and 201 in its rear wall, through which extend the levers 25 and 26 of the massage means. The slots are closed by abutting and overlapping brushes 202 and 203 arranged along the longitudinal extent of the slots.

The brush 204 is detachably slid onto the front ends of levers 25 and 26, clips 282 extending from the brush frame 285 over and underneath said levers; the screws 283 on said levers extend into one or the other opening 284 in the brush frame 285, allowing relative adjustment of these parts.

Upon the left side of the enclosure 188 I provide in an extension 205 the photographic and mirror means 206 which may be slid into the treatment chamber proper 189 upon telescopically collapsible rails 207, after the sliding door 208 has been raised. The right side wall of the enclosure 188 accommodates the screened window 209 which is opened by a nurse between treatments, and the inwardly opening door 210. From the upper end of door 210 extends a sector 211 which is provided with a flange limiting the opening of the door. The switch 279 is arranged behind door 280, which is arranged to swing out from the front of housing 1 around hinges 281. This door is opened by the nurse when one of the special liquids in containers 68 is to be applied to the face of the patient in case of disease of the skin or when the skin is otherwise in an abnormal condition. The hidden switch 279 controls not only the catches 277, 278 but also the valve 56, in series with said catches.

When the switch on board 182 corresponding to the valve 56 is closed, a treatment with the respective medicament from one of containers 68 is automatically included in the treatment cycle; switch 279 allows the nurse to control such treatment independently, e. g. in a larger dose than provided for in the treatment cycle. The medicaments which are thus dispensed upon the special prescription of the physician may be strong and dangerous, and it is therefore highly undesirable that access is had to the enclosure during the period of application of these medicaments. Therefore, I provide upon the window 209 and upon the door 210 electro-magnetically operated catches or locks 277 and 278, which are of a type well known by those acquainted with the respective arts, and which prevent the opening of the window or the door, when they are actuated. They are actuated by switch 279 (Fig. 16) and the window and door are therefore always locked, when by means of said switch medicaments are dispensed from one or the other of containers 68.

A loud speaker 212 is built into the ceiling of the upper extension 191, whereas the therapeutic lamp 213 is arranged in the slanted back wall of said extension. The filter sector 214 is arranged in front of the lamp 213. The said sector may be manipulated by the handle 215, so that various light filters, arranged on the sector, may be interposed between the lamp and the treatment chamber.

Upon the inclined front wall of extension 191 a lamp 216 is mounted which serves for illuminating purposes.

The extension 191 also contains the pipe 217 which extends below the ceiling of said extension and serves as means for spraying the chamber with liquids supplied through the conduit 154.

Figures 4, 5:
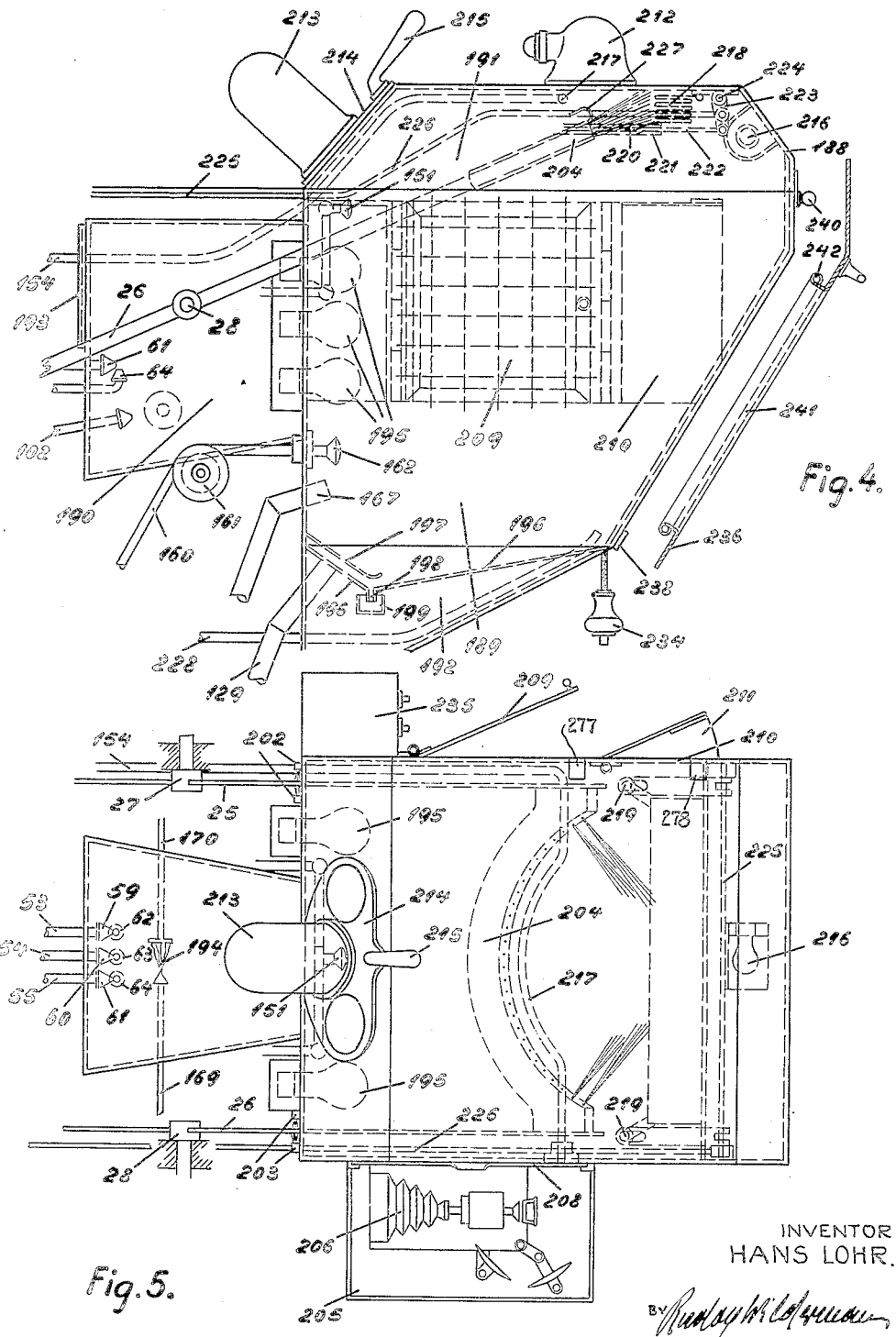
Fig. 4 shows a partly sectioned side view of the enclosure.
Fig. 5 shows a corresponding top view.
Figures 6, 7:
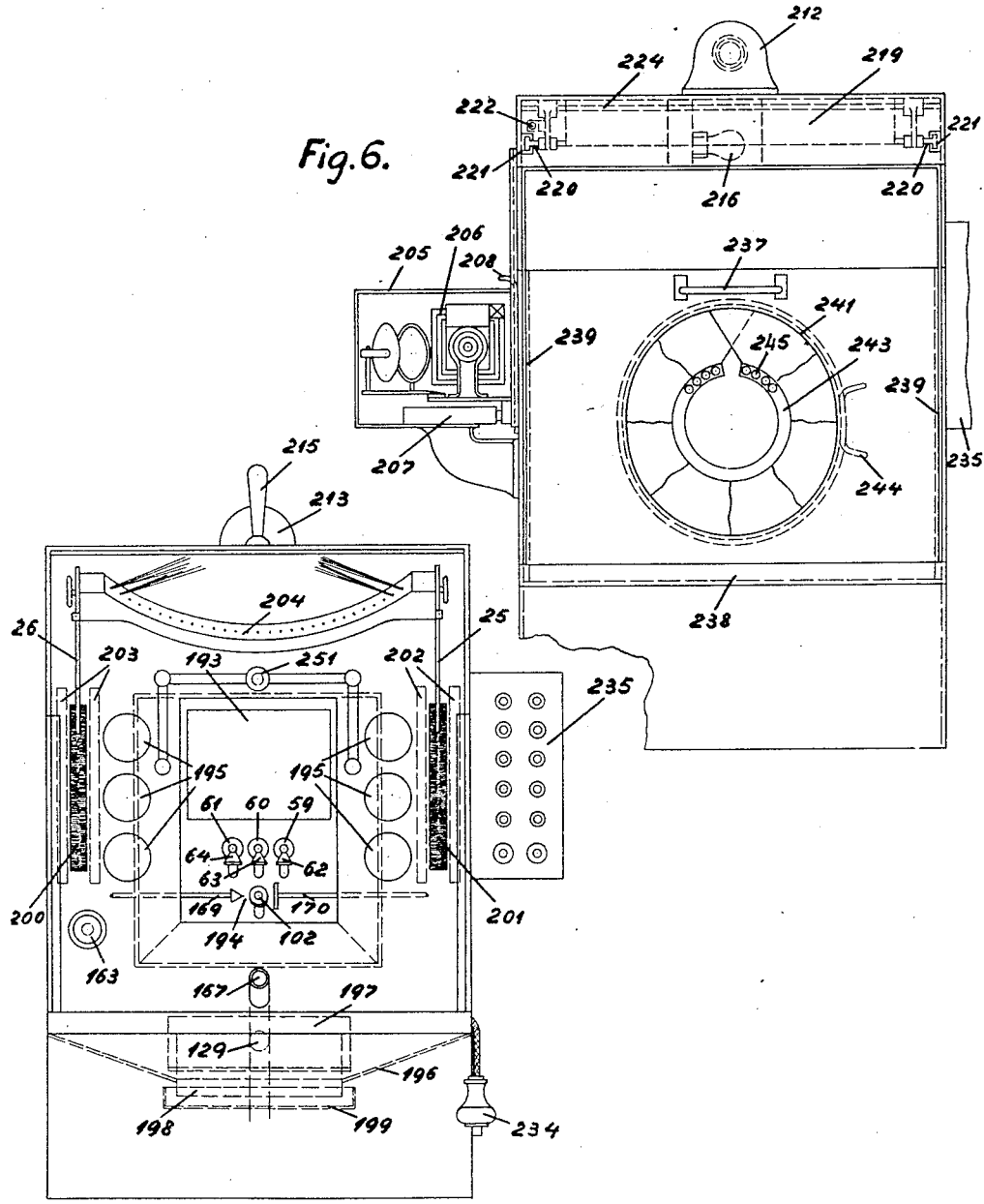
Fig. 6 shows a front view of the whole enclosure.
Fig. 7 shows a corresponding front view of the enclosure with the front cover removed.

The upper extension also accommodates a towel 218 (Fig. 4). It is folded up in zig-zag fashion and fastened along its upper edge. However, it also can be rolled up upon a mandrel.

Eyelets 219 are provided along the lower end of the towel 218, which are fastened upon little slides 220 adapted to move along the rails 221. The slides 220 are respectively connected by rods 222 to levers 223 which are fulcrumed at 224 in the extension 191 and which are connected with each other by means of a transverse rod 225. One of the levers 223 is engaged by a rod 226 entering upon the treatment chamber from the back thereof. From the rod 226 to a cam on the cam shaft extends an operative connection which is similar to the operative connection 122—126 operating the valve 119.

When the slides 220 are moved backwardly by an operation of rod 226 the eyelets 219 are slid over the hooks 227, which are mounted upon the front ends of the levers 25 and 26. When the massage brush moves down, it carries along the towel which is wiped over the face during the upward movement of the massage brush.

A conduit 228 branches off the conditioned air conduit 202 and enters upon the treatment chamber through the lower extension 192. A mouth piece 233 is connected to this branch conduit 228, through which air is directly adduced to the mouth of the person to be treated (Figs. 8, 9, and 10).

The mouth piece 233 connects to the conduit 228 by means of the connecting piece 229 which extends from the valve chamber 230. That chamber has two valves. One valve 231 opens inwardly, for the purpose of breathing-in, whereas the other, 232, opens outwardly; through the latter the air is breathed out.

The mouth piece 233 connects to the valve chamber 230. It is shaped so that it extends from the mouth of the user directly down and back underneath the chin and it is balanced so that it normaly depends in the position of use.

From the outside of the treatment chamber laterally depends the bell button 234 by which the person to be treated sounds an alarm.

The switch box 235 is disposed next to the enclosure. By means of the electric push buttons arranged upon said box the person to be treated may open or close the main circuit or the circuits serving for the operation of the part treatments which are comprised in the schedule of treatment; independent treatments thus may be set into operation by the user.

The box 235 is arranged in such fashion that it is exposed to the vision of the person upon the inside of the enclosure through the screened window 209, and so that said person may read the legends arranged alongside of the various push buttons. The glass of the window is prepared in such manner that no condensation, which would obscure vision, collects thereon.

The slightly backwardly inclined elevation of the front of the chamber is closed by the cover 236, which may be inserted by means of the handles 237 into a groove 238 extending along the lower front edge of the chamber. It fits against lateral strips 239 and is fastened by laterally arranged latches 240.

The cover 236 has an opening 241 which substantially fits the shape of the head and the edge of which is turned inwardly so as to provide a flange 242. Around this flange, I arrange a collar-like part 243 which is made of pliable material. It is fastened by the wire frame 244, which is adapted to snap around the flange 242. The collar 243 is radially slit open, and is here provided with adjustable closing means 245 which permit the collar to be tightly fitted around the neck of the person to be treated.

Upon the rear wall of the housing 1, I mount the projecting means 246 from which pictures are projected onto the screen 193.

Figure 15:
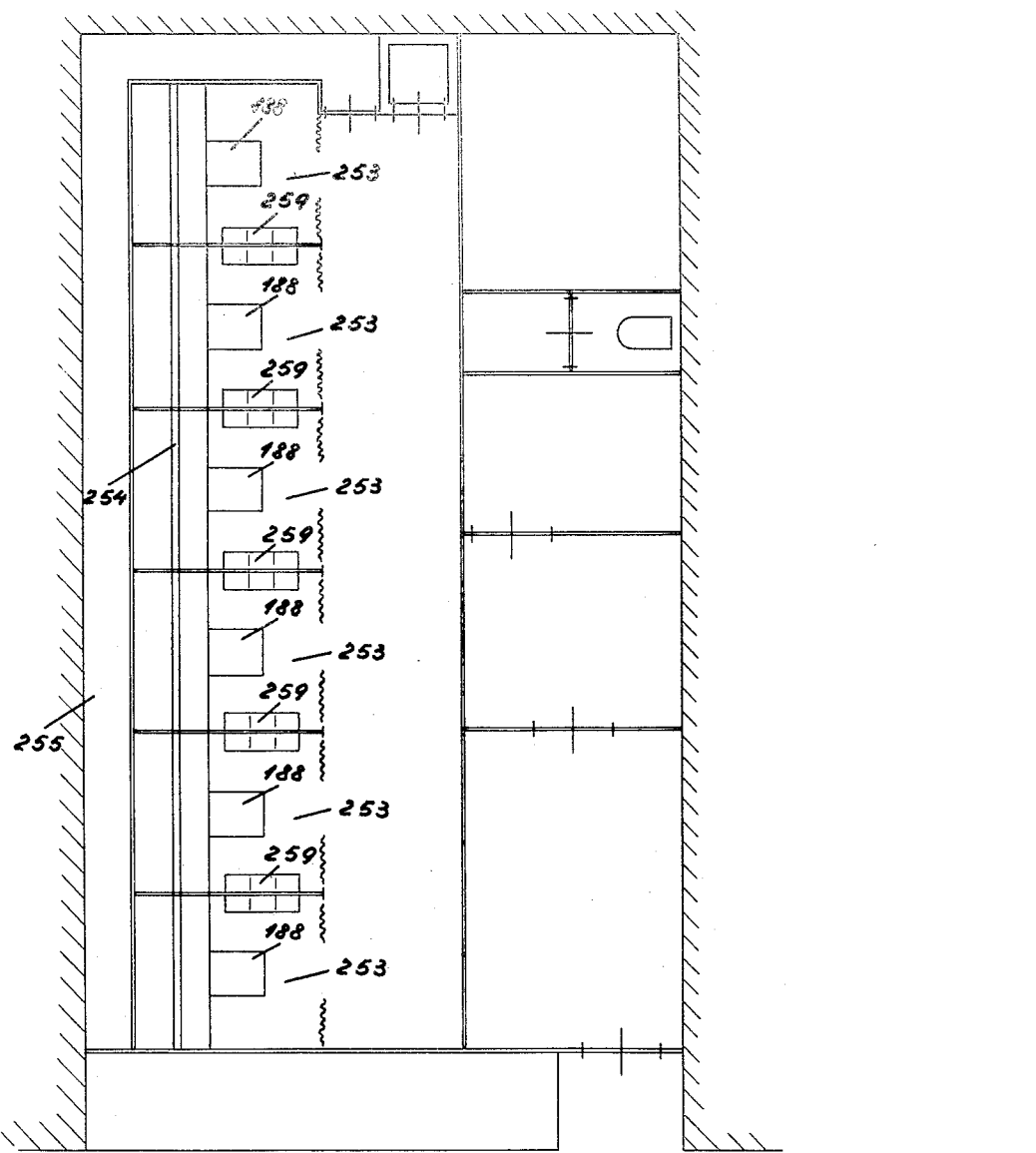
Fig. 15 shows a schematic view of my apparatus in series arrangement.

In Fig. 15 I show the lay-out of a plurality of my apparatus in series arrangement. Into adjoining, separate rooms 253, in which are the persons to be treated during the treatment, project from one continuous wall, which takes the place of the front wall of the housing, the enclosures 188, and upon said wall are also arranged the control and indicating mechanism which protrude from the front wall of the housing in the side views of Figs. 2 and 3. All the mechanism necessary for the operation extends backwardly from a separating wall 254, and may be reached only from the aisle 255 which extends therebehind. The other rooms shown are for the physicians, the attendants, and also serve as waiting rooms, etc. Between adjoining rooms, tool boxes 259 are arranged in the walls separating adjoining treatment rooms.

Figure 16:
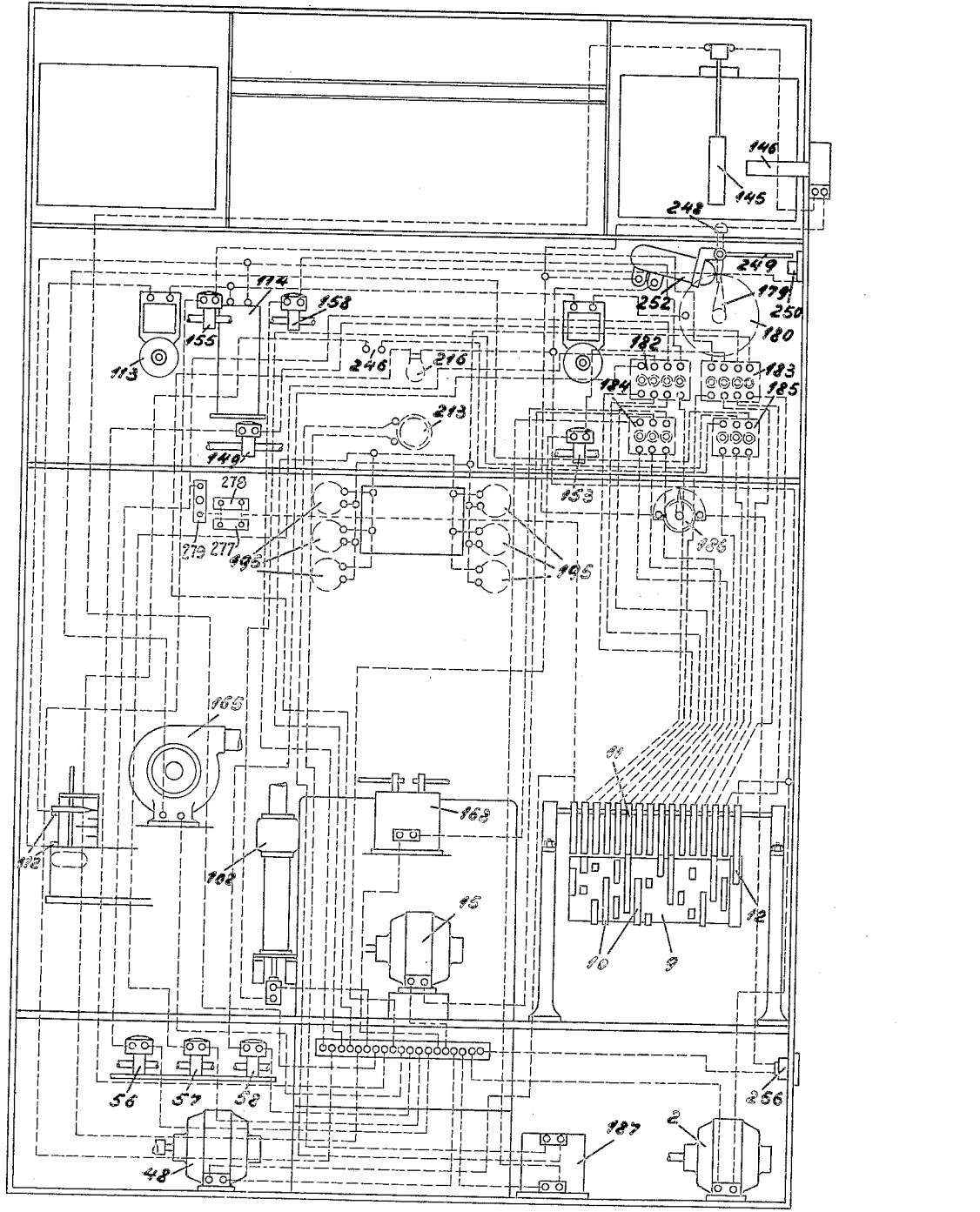
Fig. 16 shows, in connection with a rear view of my apparatus, a diagram of the electric connections.

The wiring diagram of Fig. 16 shows that all electric devices of my apparatus are connected by means of a plug member 256 to an electric current supply. The motor 1, the lamp 216, and the commutator drum 9, are connected in parallel directly to plug member 256, these three circuits being controlled by the mercury switch 252. However, the heating element 154 and the thermostat 156 are connected to the plug 256 directly, without any intermediary switch. All other electric devices are supplied with current by means of brushes from the commutator.

Figure 17:
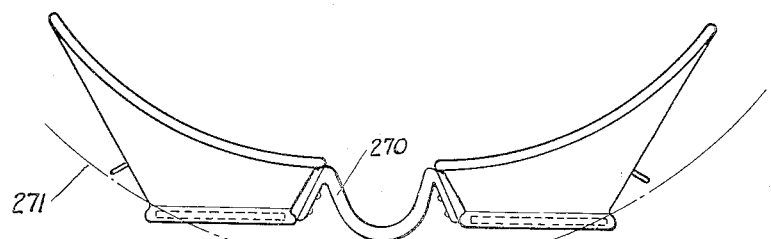
Figs. 17 and 18 are top and front views of the means used for protecting the eyes of the person to be treated.
Figure 18:
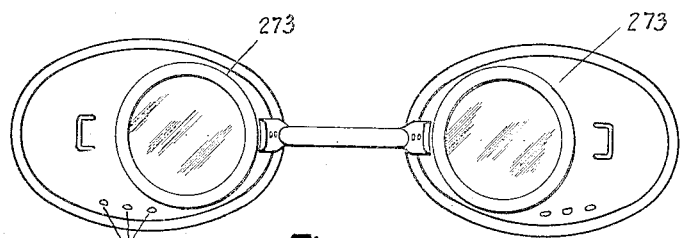

The eyes of the person to be treated may be protected by the glasses shown in Figs. 17 and 18. These glasses have the form of goggles but they are considerably smaller in proportion, so that they fit into the eye openings of the skull. The bridge 270 of the eye glasses is therefore rather high and the forehead mostly hides said goggles in a top view, the outline of the forehead being indicated at 271 in Fig. 17. The goggles are provided with openings 272 near their lower edges, below the transparent part 273, so that the perspiration of the user or sprayed liquids may be drained from the inside of the goggles. The perspiration dripping from the forehead of the user will not enter upon the goggles because they are set back below the forehead. These goggles provide an adequate protection for the eyes of the person to be treated; still they expose practically the whole face for the treatment.

Figures 19, 20:
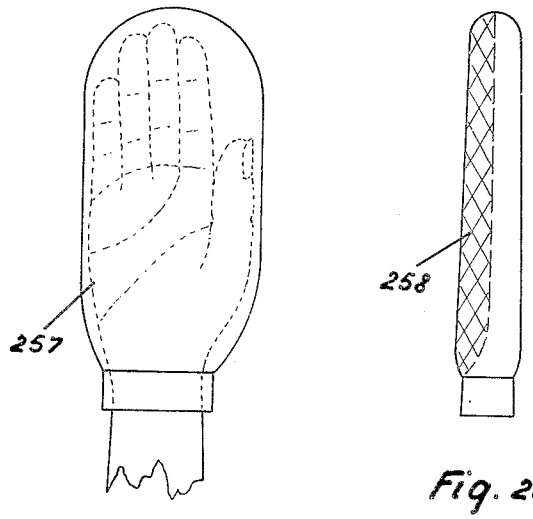
Figs. 19 and 20 are front and side views of the glove used for protecting the hand of the person to be treated.

The glove 257 which is shown in Figs. 19 and 20, encloses the whole hand of the person to be treated and is provided with an active absorption layer 258 upon its inside. It is tightly fitted around the wrist of the user.

Attention is called to a companion application, Serial No. 468,237, filed July 16th, 1930, of the applicant for Method of and means for exterior body treatments.

Although I have shown and described several specific forms of embodiment of my invention in detail, yet I do not wish to be limited thereby except as the state of the art and the appended claims may require, for a large range of modifications and changes suggest themselves to the persons skilled in the respective arts, without thereby bringing about a departure from the spirit of my invention.

I claim:—

1. The method of applying a facial treatment to a person's head in an enclosure, comprising conditioning the atmosphere surrounding the head in the enclosure, subjecting the skin of the face to physical treatments while it is exposed to the conditioned atmosphere of said enclosure, and altering the condition of the atmosphere surrounding the head in the enclosure during such treatments in predetermined relationship to the treatments.

2. The method of applying a facial treatment to a person's head in an enclosure, comprising conditioning the atmosphere surrounding the head in the enclosure and subjecting the skin of the face to fluids varying in temperature and composition while it is exposed to the conditioned atmosphere of said enclosure.

3. The method of applying a facial treatment to a person's head in an enclosure, comprising conditioning the atmosphere surrounding the head in the enclosure, massaging the skin of the face while it is exposed to the conditioned atmosphere of said enclosure, and predeterminedly altering the condition of said atmosphere during the process of said massage.

4. An apparatus of the kind described comprising an enclosure for a person's head, a plurality of face treating means in said enclosure, means automatically actuating said treating means in a predetermined rotation of steps so that they combine in producing a desired effect, mechanical means for modifying the nature of one of said treating means but maintaining their predetermined rotation of actuation, and means conditioning the atmosphere in said enclosure while said means are being actuated.

5. An apparatus of the kind described comprising an enclosure for a person's head, a plurality of face treating mechanical means in said enclosure, means automatically actuating said treating means according to a predetermined time schedule so that they combine in producing a desired effect, means for modifying said treating means but maintaining their schedule of actuation, and means conditioning the atmosphere in said enclosure while said means are being actuated.

6. An enclosure for facial treatments comprising a treatment chamber adapted sealedly to receive the head of the person to be treated, face treating means disposed in said enclosure, a detachable cover on the front of said enclosure, and a yieldable collar replaceably inserted in said cover and adapted sealedly to extend around the neck of a person, so that the head of said person may completely be secluded in said chamber from the outer air for the purpose of treatments therein.

7. An enclosure for facial treatments comprising a treatment chamber adapted sealedly to receive the head of the person to be treated, face treating means disposed in said enclosure, a detachable cover on the front of said enclosure, a replaceable, yieldable substantially radially slitted collar forming part of said cover and adapted sealedly to extend around the neck of a person, and means adjustably closing said collar where it is slitted, so that the head of said person may readily be secluded in said chamber from the outer air for the purpose of treatments therein.

8. An enclosure for facial treatments comprising a treatment chamber adapted sealedly to receive the head of the person to be treated, face treating means disposed in said enclosure, a detachable cover on the front of said enclosure with a substantially oval opening, a yieldable collar fitting said opening, a flange protruding from said enclosure around said opening, and a wire frame detachably retained on said cover by said flange and clampedly retaining said collar on said cover, so that said head may be extended through said collar into said chamber for secluded exposure to said treating means therein.

9. An enclosure for facial treatments comprising a treatment chamber adapted sealedly to receive the head of the person to be treated, a cover on the front of said chamber adapted to be closed around the neck of said person, and a door on said enclosure for the insertion of a hand, opening into said enclosure and a check on said door, permitting said door to be opened so far as to allow a hand extended therethrough to reach the face of said person, said door blocking, however, access of the hand to the rest of the space of said enclosure.

10. An enclosure for facial treatments comprising a treatment chamber adapted sealedly to receive the head of the person to be treated, fluid dispensers issuing upon said chamber, valves controlling said dispensers, massage means oscillatably disposed in said chamber, a mechanism actuating said massage means during dispensation of some of said fluids, said fluids coacting with said massage means on the face of said person, and means operatively connecting said valves with said mechanism and coordinating the dispensation of fluids from said dispensers with the action of said massage means upon said head.

11. An enclosure for facial treatments comprising a treatment chamber adapted sealedly to receive the head of the person to be treated, fluid dispensers issuing upon said chamber, a tool for operation on the face operably disposed in said enclosure, a downward extension directed away from said head, merging with said chamber and draining waste fluids therefrom, an upward extension on said chamber accommodating said tool when not in use, a downwardly directed fluid spray, the fluids being dispensed and sprayed onto the face of said person and conditioning and washing the face before, while and after it is acted upon by said tool mounted in said upward extension, and means coactingly actuating said dispensers, tool and spray.

12. An enclosure for facial treatments comprising a treatment chamber adapted sealedly to receive the head of the person to be treated, an upward extension on said treatment chamber, massage means oscillatably disposed in said chamber, a towel stored in said extension, and a mechanism adapted to engage said towel upon said massage means, said massage means carrying said towel over the head of the person to be treated, when they are oscillated after said towel has been engaged thereon.

13. In combination with an enclosure for facial treatments comprising a treatment chamber adapted sealedly to receive the head of the person to be treated, a fluid dispenser issuing upon the head of said person in said chamber, a tool for operation on the face operably disposed in said enclosure, means actuating said fluid dispenser and said tool, a mechanism operating said means, in a predetermined cycle, so that said fluids and said tool coactingly treat the head of the person to be treated, fluid sources, and a multiple valve interposed between a plurality of said sources and said fluid dispenser.

14. An enclosure for facial treatments comprising a treatment chamber adapted sealedly to receive the head of the person to be treated, a fluid dispenser issuing upon said chamber, electro-magnetic valves controlling the flow of fluids to said dispenser, a motor driven master controller controlling said electro-magnetic valves in a predetermined treatment cycle, a multiplicity of fluid sources, and selective valves independent of said controller and complementarily connecting pluralities of said sources to said electromagnetic valves.

15. In combination with an enclosure for facial treatments comprising a treatment chamber adapted sealedly to receive the head of the person to be treated, fluid dispensers issuing upon said chamber, means actuating said fluid dispensers, electric devices operating said means, a motor driven commutator controlling said electric devices, said dispensers being actuated in predetermined rotation during one revolution of said commutator which represents one cycle of treatment, fluid sources, and valves selectively interposed between one of said dispensers and a plurality of said fluid sources, whereby the treatment dispensed during said cycle may be modified.

16. In combination with an enclosure for facial treatments comprising a treatment chamber adapted sealedly to receive the head of the person to be treated, a fluid dispenser issuing upon the face of the person in said chamber, and a tool for operation on the face operably disposed in said enclosure, means actuating said fluid dispenser and said tool, electric devices operating said means, a motor driven commutator controlling said electric devices, and means predeterminedly adjusting the speed of rotation of said commutator, so that the period, during which the head of the person to be treated is coactively treated by said tool and fluids, may be controlled.

17. In combination with an enclosure for facial treatments comprising a treatment chamber adapted sealedly to receive the head of the person to be treated, fluid dispensers issuing upon the face of the person in said chamber, and a tool for operation on the face operably disposed in said enclosure, means actuating said fluid dispensers and said tool, electric devices operating said means, a motor driven commutator controlling said electric devices so that said fluids and said tool coact in a treatment cycle, a cam driven in synchronism with said commutator, and an alarm actuated by said cam when a change of treatment is caused by the action of the commutator.

18. In combination with an enclosure for facial treatments comprising a treatment chamber adapted sealedly to receive the head of the person to be treated, treating means for operation on the face operably disposed in said enclosure, electric devices operating said means, a motor driven commutator controlling said electric devices, so that said treating means coact in a treatment cycle, and an indicator operated in synchronism with said commutator, indicating the treatments caused to be given by the means operated by said electric devices, as controlled by said commutator.

19. In combination with an enclosure for facial treatments comprising a treatment chamber adapted sealedly to receive the head of the person to be treated, treating means for operation on the face operably disposed in said enclosure, electric devices operating said means, a motor driven commutator controlling said electric devices, so that said treating means coact in a treatment cycle, an indicator operated in synchronism with said commutator, and a dial in combination with the said indicator provided with annular sectors, indicating the treatments given by said means, as controlled by said commutator.

20. In combination with an enclosure for facial treatments comprising a treatment chamber adapted sealedly to receive the head of the person to be treated, treating means for operation on the face operably disposed in said enclosure, electric devices operating said means, a motor driven commutator controlling said electric devices, so that said treating means coact in a treatment cycle, an indicator operated in synchronism with said commutator, indicating the treatments caused to be given by the means operated by said electric devices, as controlled by said commutator, and alarm means actuated by said indicator before a revolution of said commutator corresponding to a complete treatment cycle is completed.

21. In combination with an enclosure for facial treatments comprising a treatment chamber adapted sealedly to receive the head of the person to be treated, treating means for operation on the face operably disposed in said enclosure, electric devices operating said means, a motor driven commutator controlling said electric devices, so that said treating means coact in a treatment cycle, an indicator operated in synchronism with said commutator, indicating the treatments caused to be given by the means operated by said electric devices, as controlled by said commutator, and a contactor comprised in the circuit of the motor driving said commutator and actuated by said indicator when a revolution of said commutator corresponding to a complete treatment cycle has been completed.

22. In combination with an enclosure for facial treatments comprising a treatment chamber adapted sealedly to receive the head of the person to be treated, and a fluid dispenser issuing upon said chamber, tanks containing cold and hot liquids, conduits connecting said tanks to said dispenser, electro-magnetic valves in said conduits, and a motor driven commutator controlling said electro-magnetic valves, so that the atmosphere in said chamber is alternately conditioned by said cold and hot liquids.

23. An enclosure for facial treatments comprising a treatment chamber adapted sealedly to receive the head of the person to be treated, a downward extension on said chamber for draining waste fluids therefrom, an upward extension on said chamber, a downwardly directed fluid spray mounted in said upward extension, a source of water, a container with conditioning liquids, a conduit connecting said source of water to said spray, a valve in said conduit and motor operated cam means controlling said valve, said spray being directed onto the head of the person to be treated, when said head is sealed into said chamber.

24. In combination with an enclosure for facial treatments comprising a treatment chamber adapted sealedly to receive the head of the person to be treated, fluid dispensers issuing upon the head sealed in said chamber, and a tool for operation on the face operably disposed in said enclosure, means actuating said fluid dispensers and said tool, electric devices operating said means, a motor driven master control for said devices whereby said fluids and tools coactingly treat said person to be treated in a predetermined cycle and manually operated switches comprised in the circuits of said electric devices whereby the schedule of said cycle may be modified.

25. In combination with an enclosure for facial treatments comprising a treatment chamber adapted sealedly to receive the head of the person to be treated, a tool for operation on the face operably disposed in said enclosure, means actuating said tool, an electric device operating said means, and a motor driven master control for said electric device, treating means adapted to be applied to said person in said enclosure, electric devices controlling said treating means, and manually operated switches controlling the latter electric devices and permitting said treating means to be superimposed upon said treatments applied to said person by said tool according to the predetermined schedule of said master control.

26. An enclosure for facial treatments comprising a treatment chamber adapted sealedly to receive the head of the person to be treated, massage means, lever means on which said massage means are adjustably mounted, means swingably and longitudinally movably supporting said lever means, and a motor driven mechanism operating the ends of said lever means in an endless track comprising two laterally spaced, curved branches, following one of which said lever means carry said massage means over the face of the person treated.

27. An enclosure for facial treatments comprising a treatment chamber adapted sealedly to receive the head of the person to be treated, massage means in said chamber, lever means on which said massage means are adjustably mounted, means swingably and longitudinally movably supporting said lever means, and endless track comprising curved branches, switch means connecting said branches, and a motor driven mechanism, operating said lever means, along the path of said track.

28. In combination with an apparatus for treating the face of a person, means positioning the face, massage means reciprocatably mounted on said apparatus in front of the face and adapted to engage upon the face when reciprocated, and a mechanism comprised in said apparatus and reciprocating said massage means.

29. In combination with an apparatus for treating the face of a person, means positioning the face, massage means reciprocatably mounted on said apparatus in front of the face and adapted to engage upon the face when reciprocated, a motor driven mechanism reciprocating said massage means, means stopping said mechanism, and means stopping said massage means in a position removed from the face, when said mechanism is stopped.

30. Massage means in an enclosure, lever means actuating said massage means, a support for said lever means, a mechanism outside of said enclosure actuating said lever means, and means yieldably closing said enclosure where said lever means pass therethrough.

31. In combination with an enclosure for facial treatments comprising a treatment chamber adapted sealedly to receive the head of the person to be treated, a fluid dispenser issuing upon said chamber, tanks for said fluids, conduits connecting said tanks to said dispensers, and transparent sections in said conduits disposed above and outside of said chamber.

32. In combination with an apparatus for facial treatments, an enclosure adapted substantially sealedly to receive the head of the person during such treatments, means blowing air into said enclosure during such treatments, a plurality of air conditioning means, valve means adapted selectively to interpose said air conditioning means in said air blowing means and a mechanism predeterminedly actuating said valve means.

33. In combination with an enclosure for facial treatments, comprising a treatment chamber adapted sealedly to receive the head of the person to be treated, means supplying air for breathing, a mouthpiece in said chamber curved to extend from the mouth of said person down and back underneath his or her chin, a conduit connecting said means to said chamber, and poppet valves connecting said conduit to said mouth piece and issuing from said mouth piece.

34. In combination with an apparatus of the kind described, an enclosure adapted substantially sealedly to receive the heads of persons and frontwardly protruding from said apparatus, face treating means in said enclosure, mechanisms actuating said means, means actuating said mechanisms in predetermined cycles, so that said face treating means operate in predetermined rotation, said mechanisms and said actuating means being accessible from the rear of said apparatus only, control means for starting, stopping and adjusting the speed of operation of said actuating means, means modifying the action of said treating means, and control means for said modifying means, said various control means being disposed at the front of said apparatus.

35. An enclosure for facial treatments comprising a treatment chamber adapted sealedly to receive the head of the person to be treated, fluid dispensers issuing upon said chamber, valves checking the dispensing of said liquid, doors in said chamber, locks on said doors, and means simultaneously actuating said valves and said locks and preventing admission to said chamber while said dispensers are actuated.

36. The method of applying a facial treatment to a person's head in an enclosure, comprising conditioning the atmosphere surrounding the head in the enclosure, subjecting the skin of the face to fluids while it is exposed to the conditioned atmosphere of said enclosure, and lowering and raising the temperature of said fluids during such secluded treatment.

37. The method of applying a facial treatment to a person's head in an enclosure, comprising conditioning the atmosphere surrounding the head in the enclosure, subjecting the skin of the face to fluids while it is exposed to the conditioned atmosphere of said enclosure, and predeterminedly chronologically changing the composition of the fluids, which the skin is secludedly subjected to.

HANS LOHR.